United States Patent
Veale et al.

(10) Patent No.: US 11,656,933 B2
(45) Date of Patent: May 23, 2023

(54) SYSTEM TUNING ACROSS LIVE PARTITION MIGRATION

(71) Applicant: International Business Machines Corporation, Armonk, NY (US)

(72) Inventors: Brian Frank Veale, Cedar Park, TX (US); Juan M. Casas, Jr., Round Rock, TX (US); Arnold Flores, Round Rock, TX (US); Michael Passaloukos, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/484,430

(22) Filed: Sep. 24, 2021

(65) Prior Publication Data
US 2023/0098905 A1    Mar. 30, 2023

(51) Int. Cl.
| | | |
|---|---|---|
| *G06F 11/00* | (2006.01) | |
| *G06F 11/07* | (2006.01) | |
| *G06F 8/61* | (2018.01) | |
| *G06F 8/65* | (2018.01) | |
| *G06F 11/14* | (2006.01) | |

(52) U.S. Cl.
CPC ............ *G06F 11/0793* (2013.01); *G06F 8/61* (2013.01); *G06F 8/65* (2013.01); *G06F 11/0772* (2013.01); *G06F 11/1438* (2013.01)

(58) Field of Classification Search
CPC .... G06F 11/0793; G06F 11/1438; G06F 8/61; G06F 8/65
See application file for complete search history.

(56) References Cited

U.S. PATENT DOCUMENTS

| | | | | |
|---|---|---|---|---|
| 7,296,189 B2* | 11/2007 | Day | ................... | G06F 11/3672 |
| | | | | 714/25 |
| 9,384,035 B2 | 7/2016 | Ito | | |
| 10,460,113 B2 | 10/2019 | Folco | | |
| 10,649,757 B1* | 5/2020 | Spreha | ...................... | G06F 8/65 |
| 11,093,231 B1* | 8/2021 | Spreha | ................... | G06F 21/57 |
| 11,340,930 B2* | 5/2022 | Schutz | ............... | G06F 9/45533 |
| 2006/0265630 A1* | 11/2006 | Alberti | ...................... | G06F 8/65 |
| | | | | 714/38.12 |

(Continued)

OTHER PUBLICATIONS

Anonymous. "Management framework for efficient live migration of virtual machines running migration-aware applications." Published Oct. 3, 2010. 5 pages. Published by IP.com. https://priorart.ip.com/IPCOM/000200260.

(Continued)

*Primary Examiner* — Loan L.T. Truong
(74) *Attorney, Agent, or Firm* — David K. Mattheis

(57) ABSTRACT

A processor may receive a software fix package. The processor may apply an interim software code fix of the software fix package to software of a device, where the interim software code fix includes adjusting one or more tunable computing parameters to one or more first values. The processor may identify that a reboot of the device is recommended for application of a permanent code fix of the software fix package. The processor may identify that the device was not rebooted after receipt of the software fix package. The processor may determine that a dynamic reconfiguration event has taken place. The processor may apply, automatically, one or more second values for the one or more tunable computing parameters associated with the interim software code fix of the software fix package.

20 Claims, 8 Drawing Sheets

(56) References Cited

U.S. PATENT DOCUMENTS

| | | | | |
|---|---|---|---|---|
| 2008/0098382 | A1* | 4/2008 | Declercq | G06Q 30/02 717/170 |
| 2008/0235659 | A1* | 9/2008 | Manglik | G06F 11/366 717/111 |
| 2009/0249284 | A1* | 10/2009 | Antosz | H04L 41/5054 717/126 |
| 2009/0254896 | A1* | 10/2009 | Khan | G06F 8/658 717/169 |
| 2010/0169874 | A1* | 7/2010 | Izard | G06F 8/71 717/170 |
| 2011/0055826 | A1* | 3/2011 | Vidal | G06F 8/71 717/177 |
| 2012/0041840 | A1* | 2/2012 | Georgis | G06F 11/26 705/26.7 |
| 2013/0159989 | A1* | 6/2013 | Deckert | G06F 8/61 717/172 |
| 2013/0283252 | A1* | 10/2013 | Mannarswamy | G06F 8/656 717/168 |
| 2014/0359558 | A1* | 12/2014 | Chamberlain | G06F 8/36 717/104 |
| 2016/0041601 | A1* | 2/2016 | Larson | G06F 11/2033 713/320 |
| 2016/0210180 | A1* | 7/2016 | Muttur | G06F 11/0793 |
| 2017/0286280 | A1* | 10/2017 | Algie | G06F 3/064 |
| 2019/0104415 | A1* | 4/2019 | Gehrmann | H04W 12/37 |
| 2019/0303129 | A1* | 10/2019 | Nidumolu | H04L 45/563 |
| 2019/0354392 | A1* | 11/2019 | Chen | G06F 11/1484 |
| 2021/0208868 | A1* | 7/2021 | Ramagiri | G06F 9/5027 |

OTHER PUBLICATIONS

Anonymous. "Method for predicting the cost of live migration of virtual machines in a customer environment." Published Oct. 19, 2010. 5 pages. Published by IP.com. https://priorart.ip.eom/IPCOM/000200578.

Anonymous. "System and method to use virtual machine live migration to dynamically form a smart network topology by inspecting network traffic." Published Mar. 6, 2012. 4 pages. Published by IP.com. https://priorart.ip.com/IPCOM/000215525.

Mell, et al., "The NIST Definition of Cloud Computing," Recommendations of the National Institute of Standards and Technology, U.S. Department of Commerce, Special Publication 800-145, Sep. 2011, 7 pgs.

Patel, et al., "Performance Analysis of Tuning Parameter of Hypervisor for Live VM Migration across Data Centers." Published Oct. 2016. 13 pages. In International Journal of Computer Science and Information Security (IJCSIS), vol. 14, No. 10. Published by IJCSIS. ISSN 1947-5500 https://sites.google.com/site/ijcsis/.

Tai, et al., "Live Data Migration For Reducing SLA Violations In Multi-tiered Storage Systems." 6 pages. In 2014 IEEE International Conference on Cloud Engineering, Boston, MA, USA, 2014, pp. 361-366.

Anonymous. "Actions taken by DLPAR scripts." Printed Sep. 24, 2021. 13 pages. Published by IBM. https://www.ibm.com/support/knowledgecenter/ssw_aix_72/generalprogramming/dr_scripts.html.

* cited by examiner

SYSTEM TUNING ACROSS LIVE PARTITION MIGRATION

BACKGROUND

The present disclosure relates generally to the field of software fixes, and more specifically to applying an interim fix with adjustable tunable parameters.

Application of emergency software fixes (e.g., i-fixes or e-fixes) may be required to resolve issues in the software or operating system of computing devices. The software fixes may require a reboot to take effect. However, the reboot may cause disruption (e.g., down-time to mission critical workloads) that is not acceptable to users of the computing devices.

SUMMARY

Embodiments of the present disclosure include a method, computer program product, and system for applying an interim fix with adjustable tunable parameters. A processor may receive a software fix package. The processor may apply an interim software code fix of the software fix package to software of a device, where the interim software code fix includes adjusting one or more tunable computing parameters to one or more first values. The processor may identify that a reboot of the device is recommended for application of a permanent code fix of the software fix package. The processor may identify that the device was not rebooted after receipt of the software fix package. The processor may determine that a dynamic reconfiguration event has taken place. The processor may apply, automatically, one or more second values for the one or more tunable computing parameters associated with the interim software code fix of the software fix package.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
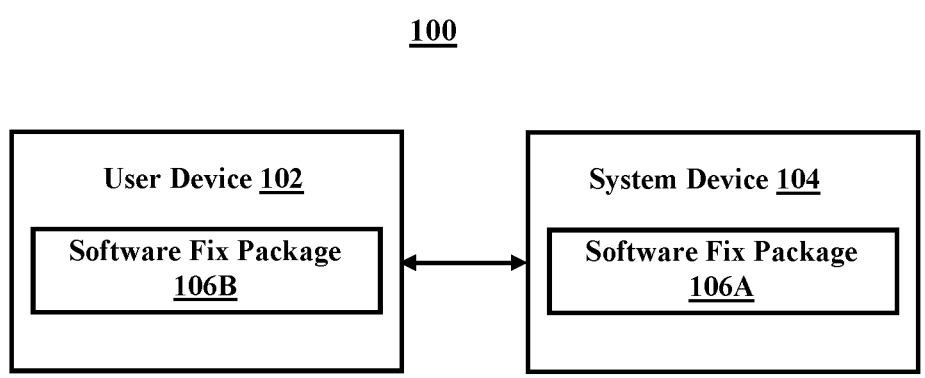
FIG. 1 is a block diagram of an exemplary system for applying interim fixes with adjustable tunable parameters, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of software fixes, and more specifically to applying an interim fix with adjustable tunable parameters that are adjustable upon dynamic reconfiguration events. While the present disclosure is not necessarily limited to such applications, various aspects of the disclosure may be appreciated through a discussion of various examples using this context.

In some embodiments, a processor may receive a software fix package. In some embodiments, the software fix package may include code fixes that are to be applied (e.g., to resolve functionality/performance issues, improve security, or add new features) to the operating system or other software of a computing device. In some embodiments, the software fix package may include files to be installed (e.g., replacement kernels or new files) on the device. In some embodiments, the software fix package may include pre-install and post-install scripts to perform tasks needed for steps before and after the installation of a new files, application, software, or script. In some embodiments, the software fix package may include pre-requisite software level information that specifies minimum and maximum levels or versions of software or operating systems to which a software code fix may apply.

In some embodiments, the software fix package may further include software to automatically change values for tunable computing parameters, and may further include information regarding the appropriate values for the tunable computing parameters, when to change the values, and when to restore the values to original or default values after or during reboot of the device.

In some embodiments, the processor may identify that a reboot of the device is recommended for application of a permanent code fix of the software fix package. In some embodiments, the processor may identify that the device was not rebooted after receipt of the software fix package. In some embodiments, the device may be a computing cluster in a server (e.g., a logical partition). For example, the device may run a bosboot command to update the boot image and recommend a reboot. In some embodiments, the device may receive a response that a user is not willing to reboot the computer. In some embodiments, the permanent code fix may include files to be installed (e.g., replacement kernels or new files) on the device to resolve issues with the functionality or performance of the device.

In some embodiments, the processor may apply an interim software code fix of the software fix package to software of the device, where the interim software code fix includes adjusting one or more tunable computing parameters to one or more first values. In some embodiments, the interim software code fix (e.g., a temporary i-fix or e-fix) may include files to be installed (e.g., replacement kernels or new files) on the device. In some embodiments, the interim software code fix may be a dynamic update that resolves an issue in the operating system or other software of the computer related to performance or functionality of the device.

In some embodiments, the one or more tunable computing parameters may include kernel tunables, operating system tunables, or networking stack tunables associated with parameters that may affect the performance or change the functionality of the computer. For example, the first tunable computing parameter may include scheduler and memory load control tunables, virtual memory manager ("VMM") tunables, synchronous I/O tunables, asynchronous I/O tunables, disk and disk adapter tunables, and inter-process communication tunables.

In some embodiments, the processor may determine that a dynamic reconfiguration event has taken place. In some embodiments, dynamic reconfiguration event may involve the process of adding, deleting, or moving resources within a network configuration without deactivating the affected major node or computing cluster in a server. As an example, the dynamic reconfiguration event may include a live migration to another system, partition, or virtual machine.

In some embodiments, the processor may apply, automatically, one or more second values for the one or more tunable computing parameters associated with the interim software code fix of the software fix package. As an example, a device may experience a loss of performance after live migration of a partition to a new system (e.g., a virtual processor folding code may not properly re-compute a folding threshold value that is used to determine when to fold and unfold a processor, removing or adding them to the processors on which work can be scheduled.). An i-fix/e-fix that delivers a new kernel that properly computes the folding threshold on boot and after each live migration may be received by the device. However, the device may be unable to reboot in order for the change to take effect. The interim fix may adjust a first tunable computing parameter of the one or more tunable computing parameters from an original value to a first value to allow proper functionality and performance of the device. After a live migration of the partition to another system, the tunable value or values may be changed to accommodate the new environment. For example, the first tunable computing parameter may be set to/adjusted to a second value from the first value.

As another example, more than one tunable parameter of the one or more tunable computing parameters may be adjusted by the interim software code fix to one or more first values or to one or more second values. In some embodiments, the set of tunable computing parameters for which values are adjusted to one or more first values (e.g., to apply the interim software code fix) may be the same as the set of tunable computing parameters for which values are adjusted to one or more second values (e.g., to apply the interim software code in the new environment). In some embodiments, the set of tunable computing parameters for which values are adjusted to one or more first values may not be the same (e.g., may only partially overlap or may not overlap at all) as the set of tunable computing parameters for which values are adjusted to one or more second values. In some embodiments, the one or more first values may be the same value as each other, different values, or a combination of both identical and different values. In some embodiments, the one or more second values may be the same value as each other, different values, or a combination of both identical and different values.

In some embodiments, the processor may determine that the reboot of the device has been initiated. In some embodiments, the processor may apply one or more default values for the one or more tunable computer parameters. Continuing the previous example, after the device has been rebooted, the permanent code fix (e.g., the new kernel that properly computes the folding threshold) may take effect, and the tunable values may be restored to default values. In some embodiments, the default values may be the original values that the tunable computing parameters were set to prior to the interim software fix (e.g., before being changed to the first values or second values). In some embodiments, the default values may be values set by the application of the permanent code fix. In some embodiments, the default values may be a combination of original values and values set by the application of the permanent code fix.

In some embodiments, the software fix package may include a dynamic logical partitioning ("DLPAR") script and post-install script. In some embodiments, the processor may install the DLPAR script. In some embodiments, the processor may run the post-install script. In some embodiments, the processor may register the DLPAR script with a dynamic reconfiguration framework of an operating system using the post-install script.

In some embodiments, the DLPAR may be a capability of a logical partition ("LPAR") or virtual machine to be reconfigured dynamically, without having to shut down the operating system that runs in the LPAR/virtual machine. In some embodiments, DLPAR may enable memory, CPU capacity, and I/O interfaces to be moved non-disruptively between LPARs within the same server. In some embodiments, the DLPAR script may compute and adjust values for one or more tunable computing parameters. In some embodiments, an emgr (interim fix manager) command may be used to install and manage system interim fixes. For example, the interim fix manager may install packages created with the epkg command and maintain a database containing interim fix information. In some embodiments, the emgr command may performs the operation of installing the DLPAR script.

In some embodiments, the post-install script may be received as part of the software fix package. In some embodiments, the post-install script may apply the interim software code fix by adjusting the value of a first tunable computing parameter from an original value to a first value.

In some embodiments, the post-install script may register for the DLPAR script to be unregistered upon the reboot (e.g., during, after, on, etc.) of the device and may register for the one or more default values for the one or more tunable computing parameters to be applied upon reboot of the device. In some embodiments, after the dynamic reconfiguration event (e.g., live partition migration) has taken place, the value of one or more tunable computing parameters may be adjusted from one or more first values to one or more second values to enable proper functioning or performance of the device under the new conditions associated with the live partition migration. For example, the automatic application of tunable values may be conducted using a DLPAR script invoked by the operating system. The workload of the device may continue running (e.g., with proper functioning or performance). Upon a reboot of the device which results in application of the permanent code fix, the operating system may automatically initialize values for the one or more tunable computing parameters (e.g., set the values to one or more default values) and may unregister the DLPAR script as a dynamic reconfiguration event handler.

In some embodiments, applying the one or more second values for the one or more tunable computing parameters associated with the interim software code fix may involve:

determining the one or more second values for the first tunable computing parameter and adjusting the one or more tunable computing parameters to the one or more second values using the DLPAR script. For example, after the dynamic reconfiguration event (e.g., a live partition migration), the operating system may invoke a dynamic reconfiguration handler. The DLPAR script may be used as a handler to determine values for tunable computing parameters (e.g., a second value for the first tunable computing parameter) and adjust the values. In some embodiments, the values for the tunable computing parameters may be provided along with conditions under which the parameters are to be set to specific values by the software fix package. In some embodiments, the software fix package may provide rules based on which data can be gathered and the one or more second values calculated.

In some embodiments, the software fix package may further include a tuning program that manages tuning of values for the one or more tunable computing parameters. In some embodiments, the tuning program may include values for one or more tunable computing parameters and the conditions under which the values may be changed. In some embodiments, the tuning program may provide rules based on which data may be gathered and the values for the one or more tunable computing parameters may be calculated. In some embodiments, the tuning program may further include values for the one or more tunable computing parameters across one or more dynamic reconfiguration operations (e.g., driven by one or more live partition migrations).

In some embodiments, adjusting the one or more first values for the one or more tunable computing parameters associated with the interim software code fix may further include: invoking (e.g., running or executing) the tuning program to adjust the one or more tunable computing parameters to the one or more first values and registering the tuning program as a dynamic reconfiguration event handler. In some embodiments, the tuning program may be invoked utilizing the interim fix manager command, emgr command. In some embodiments, the emgr command may register the tuning program as a dynamic reconfiguration event handler. In some embodiments, the dynamic reconfiguration event handler may be a code (a sub-routine) that executes when the associated dynamic reconfiguration event occurs. In some embodiments, upon (e.g., during or after) a dynamic reconfiguration event (e.g., live partition migration), the operating system may invoke the dynamic reconfiguration event handler, and the tuning program may adjust values for the one or more tunable computing parameters (e.g., adjusting the first tunable computing parameter from the first value to the second value).

In some embodiments, the emgr command (e.g., interim fix manager command) may be used to install and manage system interim fixes. In some embodiments, the interim fix manager may install packages created with the epkg command and may maintain a database containing interim fix information. In some embodiments, the emgr command may apply the interim software code fix and tuning program that manages tuning of values for the first tunable computing parameter.

In some embodiments, adjusting the one or more tunable computing parameters to the one or more first values may include: utilizing an interim fix manager to adjust the one or more tunable computing parameters to the one or more first values and registering the interim fix manager as a dynamic reconfiguration event handler. For example, new code added to the emgr command may store values for tunable computing parameters (e.g., a first and second value for the first tunable computing parameter) and conditions under which they are to be applied internally. The new code added to the emgr command may also register the emgr command as a dynamic reconfiguration event handler. During a dynamic reconfiguration event, the emgr command may be invoked for the registered event and then directly apply needed tunable values (e.g., adjust the value for the first tunable computing parameter).

In some embodiments, the emgr command may further be enhanced to examine the system during a dynamic reconfiguration event and compute specific tunable values allowing the emgr command to apply different values based on differing environmental factors (such as the processor mode or model in which the logical partition is running). In some embodiments, the emgr command may automatically reset the value of the first tunable computer parameter to the default value during a subsequent reboot of the computer.

Referring now to FIG. 1, a block diagram of a system 100 for applying interim fixes with adjustable tunable parameters is illustrated. System 100 includes a user device 102 and a system device 104. The user device 102 is configured to be in communication with the system device 104. The system device 104 includes a software fix package 106A that is transmitted to the user device 102. In some embodiments, the user device 102 and the system device 104 may be any devices that contain a processor configured to perform one or more of the functions or steps described in this disclosure.

In some embodiments, user device 102 receives the software fix package 106B. In some embodiments, software fix package 106B is the same as or substantially similar to software fix package 106A. In some embodiments, software fix package 106B may have different values for tunable parameters than software fix package 106A. The user device 102 identifies that a reboot of the device is recommended for application of a permanent code fix of the software fix package. The user device 102 identifies that the device was not rebooted after receipt of the software fix package 106. The user device 102 applies an interim software code fix of the software fix package 106 to software of the device, where the interim software code fix includes adjusting a first tunable computing parameter from an original value to a first value. The user device 102 determines that a dynamic reconfiguration event has taken place. The user device 102 applies, automatically by a processor, a second value for the first tunable computing parameter associated with the interim software code fix of the software fix package. The user device 102 determines that a reboot of the device has been initiated. The user device 102 applies the default value for the first tunable computing parameter.

Referring now to FIG. 2, illustrated is a flowchart of an exemplary method 200 for applying interim fixes with adjustable tunable parameters, in accordance with embodiments of the present disclosure. In some embodiments, a processor of a system (such as the system 100 of FIG. 1) may perform the operations of the method 200. In some embodiments, method 200 begins at operation 202. At operation 202, the processor receives a software fix package. In some embodiments, method 200 proceeds to operation 204. At operation 204, the processor applies an interim software code fix of the software fix package to software of the device, where the interim software code fix includes adjusting one or more tunable computing parameters to one or more first values. In some embodiments, method 200 proceeds to operation 206. At operation 206, the processor identifies that a reboot of a device is recommended for application of a permanent code fix of the software fix package. In some embodiments, method 200 proceeds to operation 208. At operation 208, the processor identifies that the device was not rebooted after receipt of the software fix package. In some embodiments, method 200 proceeds to operation 210, where the processor determines that a dynamic reconfiguration event has taken place. In some embodiments, method 210 proceeds to operation 212. At operation 212, the processor applies, automatically, one or more second values for the one or more tunable computing parameters associated with the interim software code fix of the software fix package.

As discussed in more detail herein, it is contemplated that some or all of the operations of the method 200 may be performed in alternative orders or may not be performed at all; furthermore, multiple operations may occur at the same time or as an internal part of a larger process.

Figure 2A:
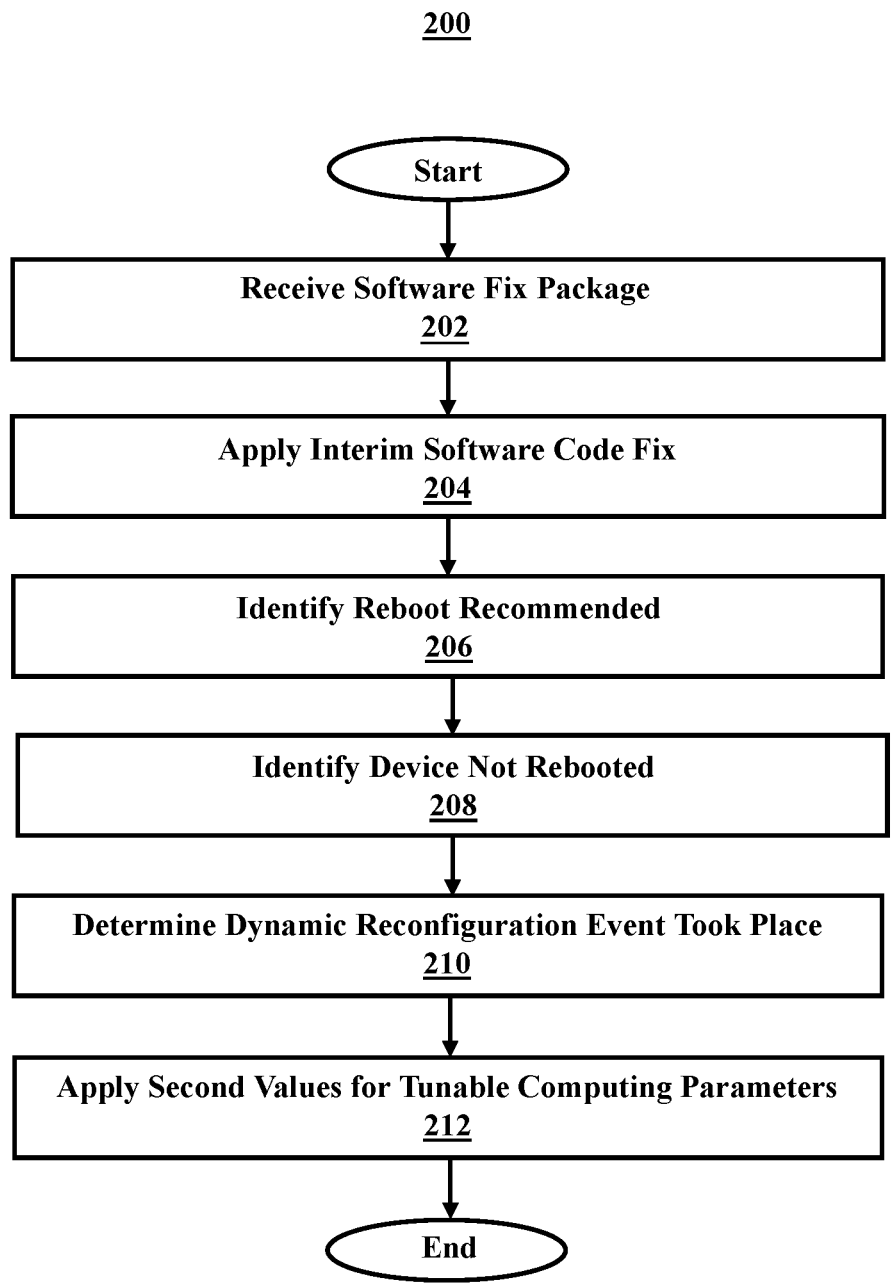
FIG. 2A is a flowchart of an exemplary method for applying interim fixes with adjustable tunable parameters, in accordance with aspects of the present disclosure.
Figure 2B:
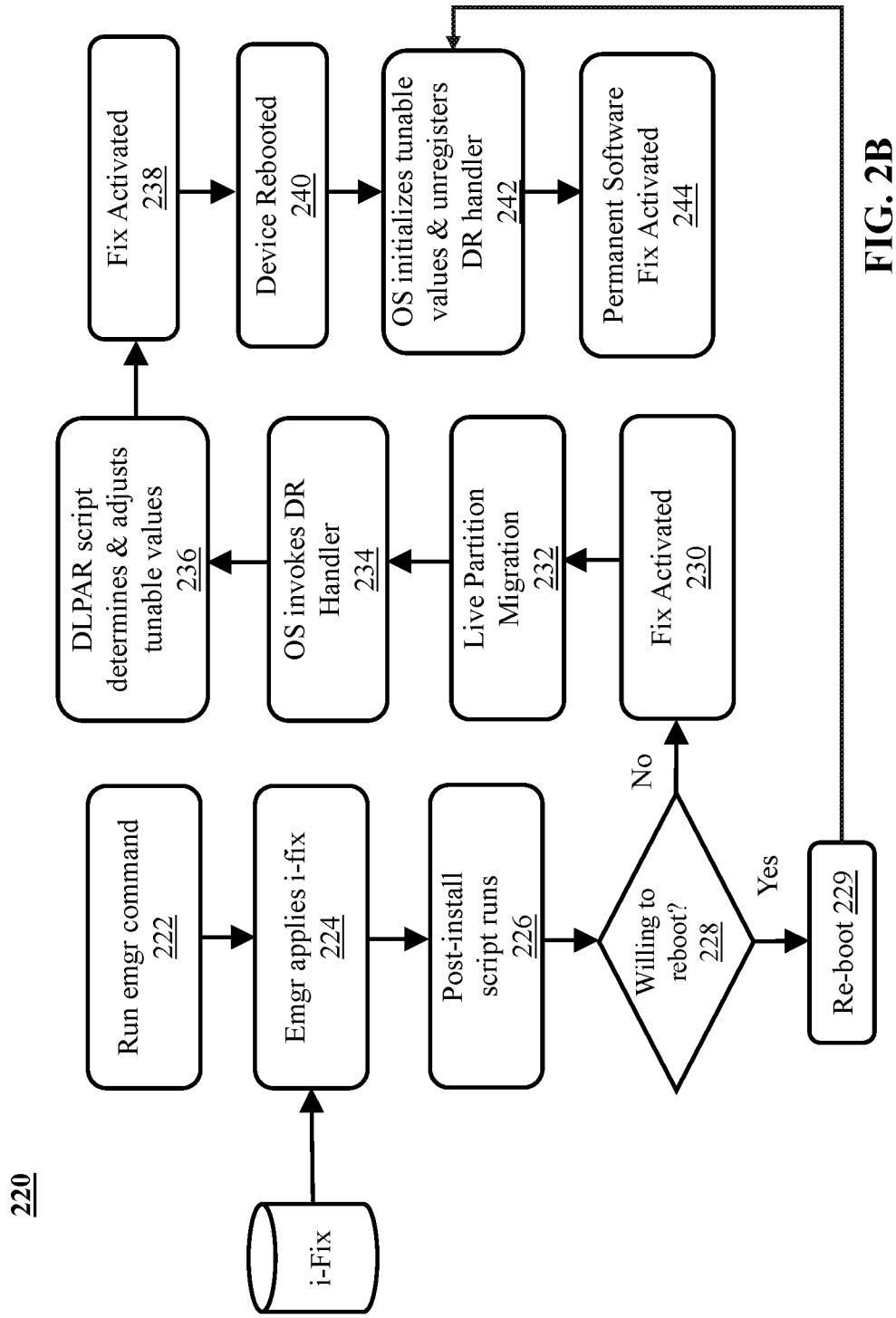
FIG. 2B is a flowchart of another exemplary method for applying interim fixes with adjustable tunable parameters, in accordance with aspects of the present disclosure.

Referring now to FIG. 2B, illustrated is a flowchart of an exemplary method 220 for applying interim fixes with adjustable tunable parameters, in accordance with embodiments of the present disclosure. In some embodiments, a processor of a system may perform the operations of the method 220. In some embodiments, method 220 begins at operation 222. At operation 222, the processor runs the emgr command. In some embodiments, method 220 proceeds to operation 224. At operation 224, the emgr command applies (e.g., install and executes) an i-fix and installs a DLPAR script. In some embodiments, the i-fix (e.g., software fix package) may include files to be replaced (e.g., new kernel for the permanent software fix), pre-install and post-install scripts, pre-requisite software level information, and the DLPAR script that determines and applies adjustable values for tunable parameters (e.g., the first tunable computing parameter). In some embodiments, method 220 proceeds to operation 226. At operation 226, the post-install script runs. In some embodiments, the post-install script may apply/set the tunable values for the tunable computing parameters (e.g., a first value for the first tunable computing parameter). In some embodiments, the post-install script may register the DLPAR script with the operating system framework for dynamic reconfiguration event handling.

In some embodiments, method 220 proceeds to decision block 228. At decision block 228, it is determined whether a reboot is recommended for the permanent software fix and whether the device has been rebooted. If a reboot is recommended and the user is willing to reboot the device, the device is rebooted at step 229. In some embodiments, method 220 proceeds to operation 242. At operation 242, the operating system resets tunable values and unregisters the DLPAR script. In some embodiments, method 220 proceeds to operation 244. At operation 244, the permanent software fix is activated. If reboot is recommended and the device is not rebooted, method 220 proceeds to operation 230. At operation 230 the interim software fix is activated, and the device can continue to run with proper performance/functionality.

In some embodiments, method 220 proceeds to operation 232. At operation 232, a live partition migration takes place. In some embodiments, method 220 proceeds to operation 234. At operation 234, the operating system invokes a dynamic reconfiguration event handler (e.g., the DLPAR script). In some embodiments, method 220 proceeds to operation 236. At operation 236, the DLPAR script determines and adjusts/sets values for the tunable parameters (e.g., adjusting the first tunable computing parameter from the first value to the second value).

In some embodiments, method 220 proceeds to operation 238. At operation 238, the interim software fix for the new environment (e.g., new partition) is activated, and the device can continue to run with proper performance/functionality. In some embodiments, method 220 proceeds to operation 240. At operation 240, the device is rebooted.

In some embodiments, method 220 proceeds to operation 242. At operation 242, the operating system automatically initializes the values for the tunable parameters to default values (e.g., the original value before the interim software code fix or a value set by the permanent software fix) and unregisters the DLPAR script as the dynamic reconfiguration event handler. In some embodiments, method 220 proceeds to operation 244. At operation 244, the permanent software fix is activated.

In some embodiments, the device may undergo a live partition migration more than one time (e.g., two, three, or more times) before the device (e.g., LPAR or virtual machine) is rebooted. For example, after operation 236, method 220 may proceed to decision block 228 and loop through operation 236 several times before the device is rebooted (not illustrated).

As discussed in more detail herein, it is contemplated that some or all of the operations of the method 220 may be performed in alternative orders, may be performed multiple times, or may not be performed at all; furthermore, multiple operations may occur at the same time or as an internal part of a larger process.

Figure 2C:
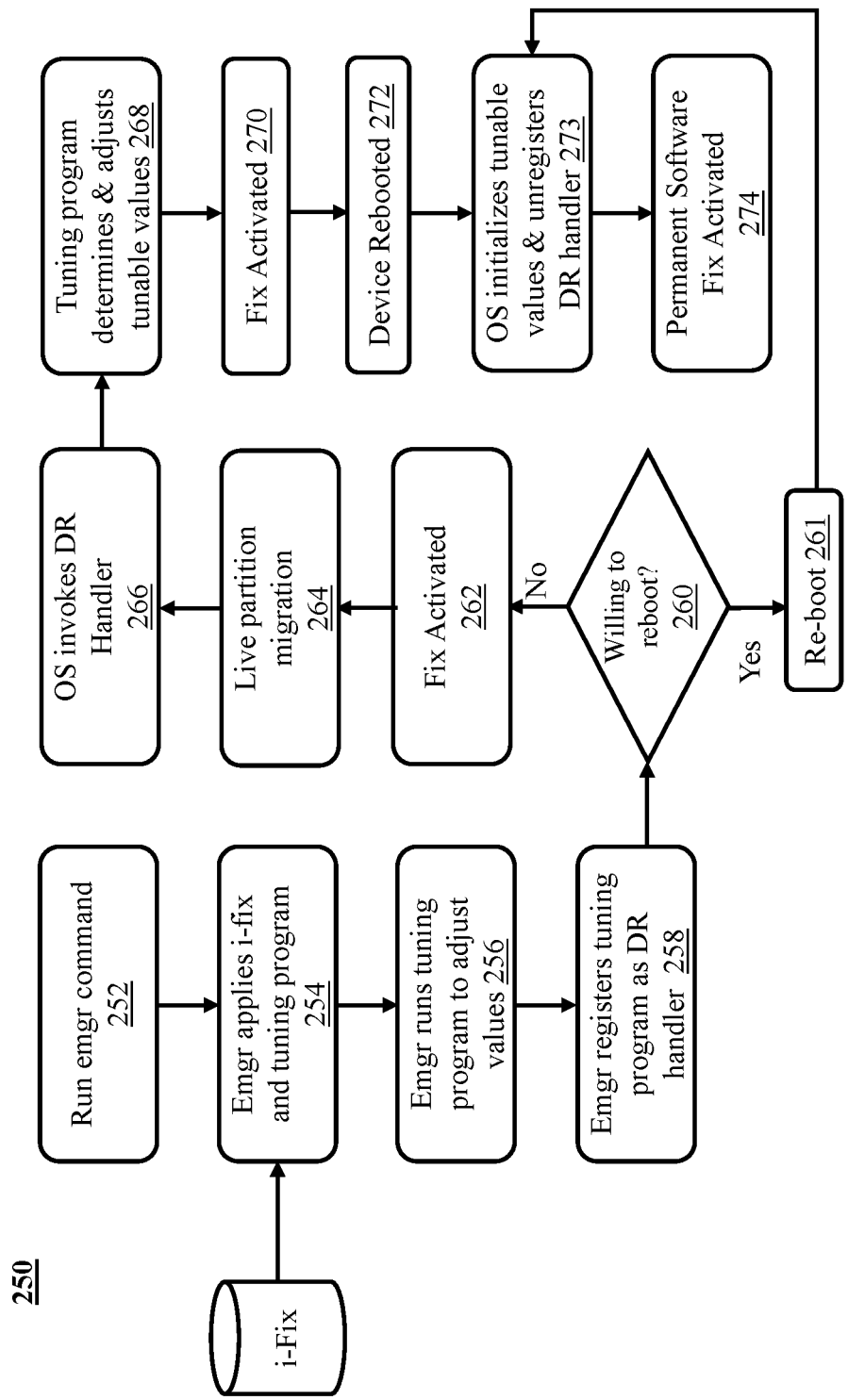
FIG. 2C is a flowchart of another exemplary method for applying interim fixes with adjustable tunable parameters, in accordance with aspects of the present disclosure.

Referring now to FIG. 2C, illustrated is a flowchart of an exemplary method 250 for applying interim fixes with adjustable tunable parameters, in accordance with embodiments of the present disclosure. In some embodiments, a processor of a system may perform the operations of the method 250. In some embodiments, method 250 begins at operation 252. At operation 252, the processor runs the emgr command. In some embodiments, method 250 proceeds to operation 254. At operation 254, the emgr command applies (e.g., installs and executes) an i-fix and the tuning program that manages tuning of values for the first tunable computing parameter. In some embodiments, the i-fix may include files to be replaced (e.g., new kernel for the permanent software fix), pre-install and post-install scripts, pre-requisite software level information, the tuning program, and information regarding the tunable values and the conditions under which they should be changed. In some embodiments, method 250 proceeds to operation 256.

At operation 256, the emgr command runs/invokes the tuning program to adjust the values for the tunable parameters (e.g., set a first value for the first tunable computing parameter). In some embodiments, method 250 proceeds to operation 258. At operation 258, the emgr command registers the tuning program as a dynamic reconfiguration event handler.

In some embodiments, method 250 proceeds to decision block 260. At decision block 260, it is determined whether a reboot is recommended for the permanent software fix and whether the device has been rebooted. If a reboot is recommended and the user is willing to reboot the device, the device is rebooted at step 261. In some embodiments, method 250 proceeds to operation 273. At operation 273, the operating system initializes the tunable values to a default value (e.g., original value prior to first value or value set by permanent software fix) and unregisters the DR handler. In some embodiments, method 250 proceeds to operation 274. At operation 274, the permanent software fix is activated. If a reboot is recommended and the device is not rebooted, method 250 proceeds to operation 262. At operation 262 the interim software fix is activated, and the device can continue to run with proper performance/functionality.

In some embodiments, method 250 proceeds to operation 264. At operation 264, a live partition migration takes place. In some embodiments, method 250 proceeds to operation 266. At operation 266, the operating system invokes a dynamic reconfiguration event handler. In some embodiments, method 250 proceeds to operation 268. At operation 268, the tuning program determines and adjusts values for the tunable computing parameters (e.g., adjusting the first tunable computing parameter from the first value to the second value).

In some embodiments, method 250 proceeds to operation 270. At operation 270, the interim software fix is activated, and the device can continue to run with proper performance and functionality. In some embodiments, method 250 proceeds to operation 272. At operation 272, the device is rebooted. In some embodiments, method 250 proceeds to operation 273. At operation 273, the operating system automatically initializes the values for the tunable parameters to default values (e.g., the original value before the first value or a value set by the permanent software fix) and unregisters the tuning program as the dynamic reconfiguration event handler. In some embodiments, method 250 proceeds to operation 274. At operation 274, the permanent software fix is activated.

In some embodiments, the device may undergo a live partition migration more than one time (e.g, two, three, or more times) before the device (e.g., LPAR or virtual machine) is rebooted. For example, after operation 268, method 250 may proceed to decision block 260 and loop through operation 268 several times before the device is rebooted (not illustrated).

As discussed in more detail herein, it is contemplated that some or all of the operations of the method 250 may be performed in alternative orders, may be performed multiple times, or may not be performed at all; furthermore, multiple operations may occur at the same time or as an internal part of a larger process.

Figure 2D:
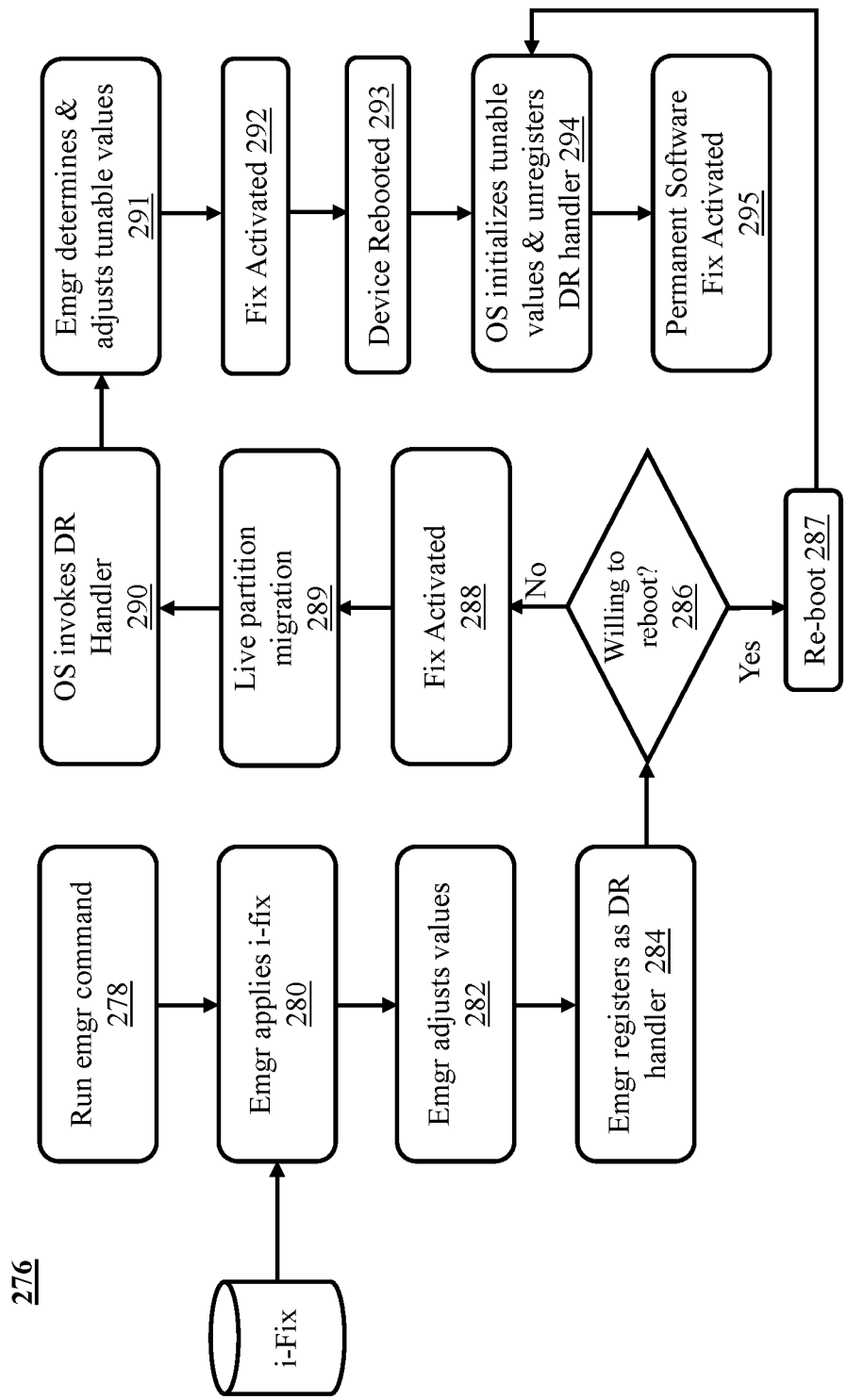
FIG. 2D is a flowchart of another exemplary method for applying interim fixes with adjustable tunable parameters, in accordance with aspects of the present disclosure.

Referring now to FIG. 2D, illustrated is a flowchart of an exemplary method 276 for applying interim fixes with adjustable tunable parameters, in accordance with embodiments of the present disclosure. In some embodiments, a processor of a system may perform the operations of the method 276. In some embodiments, method 276 begins at operation 278. At operation 278, the processor runs the emgr command. In some embodiments, method 276 proceeds to operation 280. At operation 280, the emgr command applies (e.g., installs and executes) an i-fix. In some embodiments, the i-fix may include files to be replaced (e.g., new kernel for the permanent software fix), pre-install and post-install scripts, pre-requisite software level information, and information regarding tunable values (e.g., values for the first tunable computing parameter) and the conditions under which they should be changed.

In some embodiments, method 276 proceeds to operation 282. At operation 282, the emgr adjusts/sets the values for the tunable parameters (e.g., first value for the first tunable computing parameter). In some embodiments, method 276 proceeds to operation 284. At operation 284, the emgr command is registered as a dynamic reconfiguration event handler.

In some embodiments, method 276 proceeds to decision block 286. At decision block 286, it is determined whether a reboot is recommended for the permanent software fix and whether the device has been rebooted. If a reboot is recommended and the user is willing to reboot the device, the device is rebooted at step 287. In some embodiments, method 276 proceeds to operation 294. At operation 294, the operating system initializes the tunable values to a default value (e.g., original value prior to first value or value set by permanent software fix) and unregisters the dynamic reconfiguration event handler. In some embodiments, method 276 proceeds to operation 295. At operation 295, the permanent software fix is activated. If a reboot is recommended and the device is not rebooted, method 276 proceeds to operation 288. At operation 288 the interim software fix is activated, and the device can continue to run with proper performance/functionality.

In some embodiments, method 276 proceeds to operation 289. At operation 289, a live partition migration takes place. In some embodiments, method 276 proceeds to operation 290. At operation 290, the operating system invokes a dynamic reconfiguration event handler. In some embodiments, method 276 proceeds to operation 291. At operation 291, the emgr command determines and adjusts values for the tunable computing parameters (e.g., adjusting the first tunable computing parameter from the first value to the second value).

In some embodiments, method 276 proceeds to operation 292. At operation 292, the interim software fix is activated, and the device can continue to run with proper functionality and performance. In some embodiments, method 276 proceeds to operation 293. At operation 293, the device is rebooted. In some embodiments, method 276 proceeds to operation 294. At operation 294, the operating system initializes the tunable values to a default value (e.g., original value prior to first value or value set by permanent software fix) and unregisters the dynamic reconfiguration event hander. In some embodiments, method 276 proceeds to operation 295. At operation 295, the permanent software fix is activated.

In some embodiments, the device may undergo a live partition migration more than one time (e.g., two, three, or more times) before the device (e.g., LPAR or virtual machine) is rebooted. For example, after operation 291, method 276 may proceed to decision block 286 and loop through operation 291 several times before the device is rebooted (not illustrated).

As discussed in more detail herein, it is contemplated that some or all of the operations of the method 276 may be performed in alternative orders, may be performed multiple times, or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
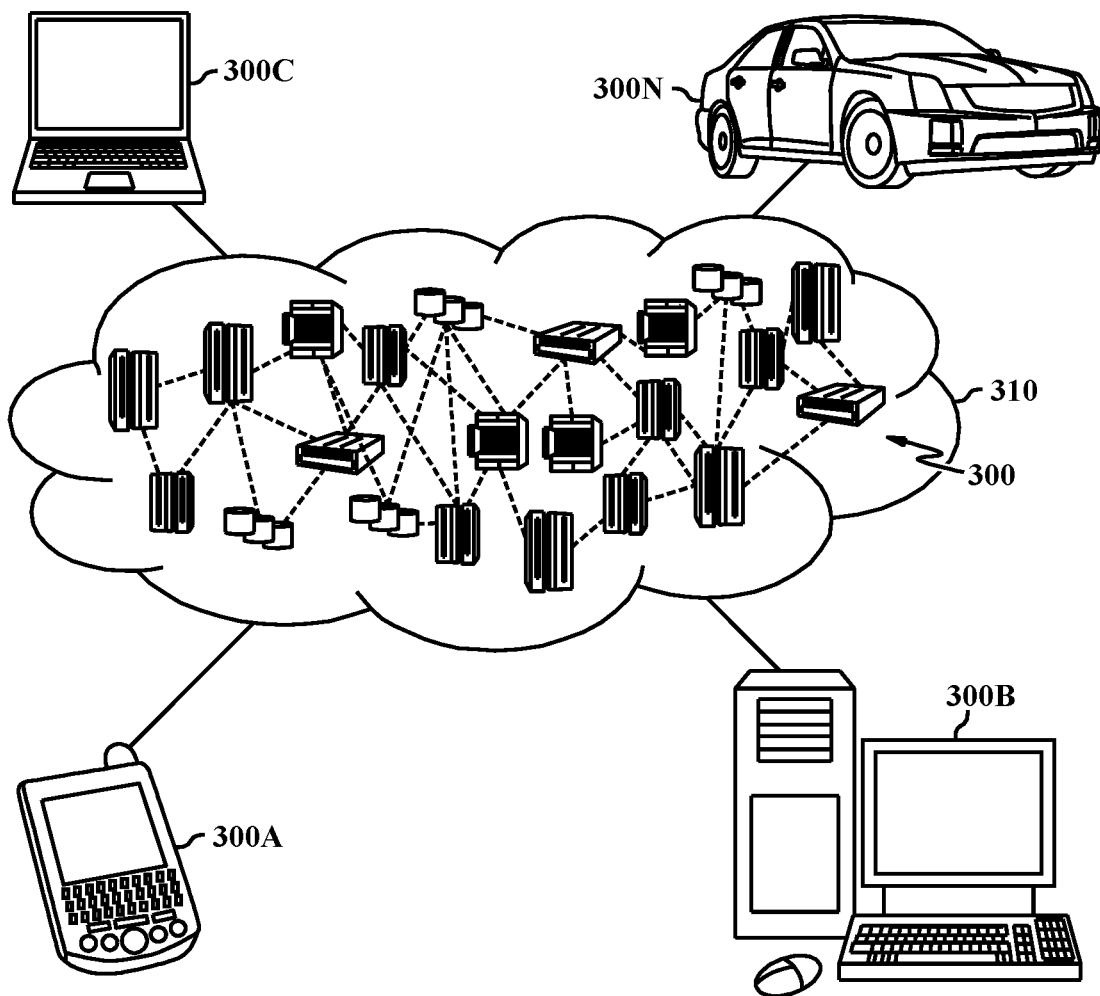
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
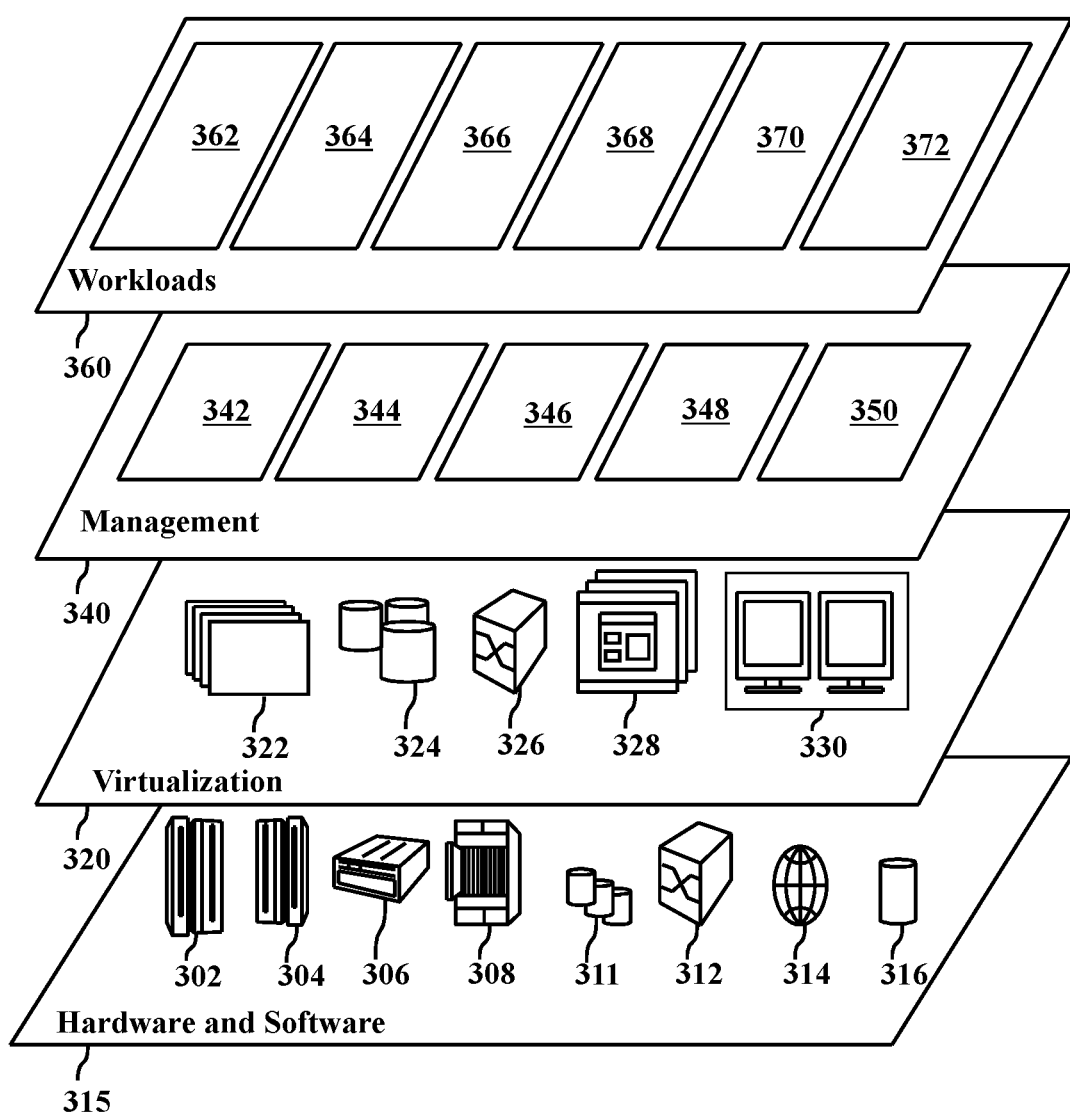
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and applying interim fixes with adjustable tunable parameters 372.

Figure 4:
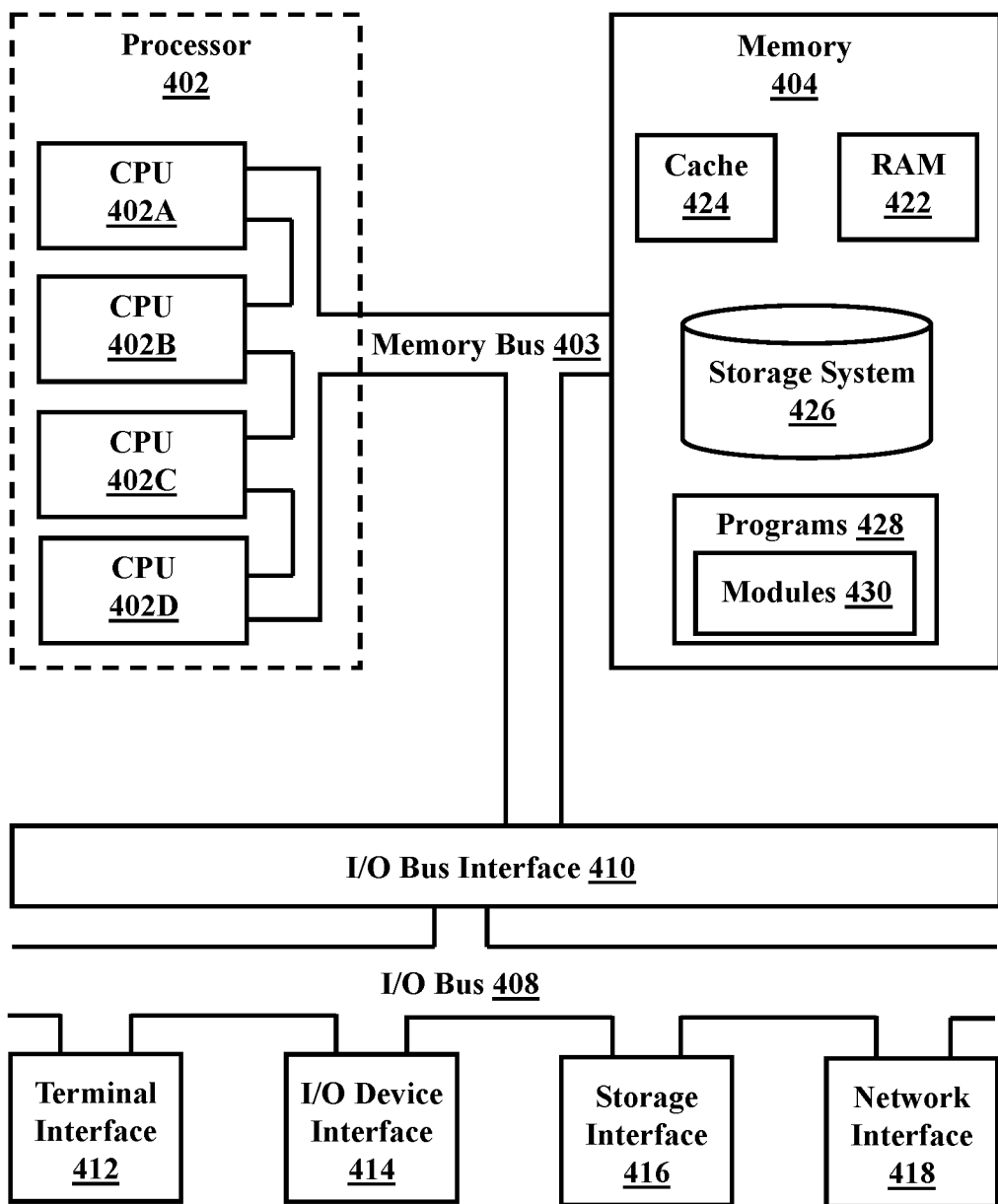
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    receiving, by a processor, a software fix package;
    applying an interim software code fix of the software fix package to software of a device, wherein the interim software code fix includes adjusting one or more tunable computing parameters to one or more first values;

identifying that a reboot of the device is recommended for application of a permanent code fix of the software fix package;
identifying that the device was not rebooted after receipt of the software fix package;
determining that a dynamic reconfiguration event has taken place; and
applying, automatically by the processor, one or more second values for the one or more tunable computing parameters associated with the interim software code fix of the software fix package.

2. The method of claim 1, further comprising:
determining that the reboot of the device has been initiated; and
applying one or more default values for the one or more tunable computing parameters.

3. The method of claim 2, wherein the software fix package includes a dynamic logical partitioning ("DLPAR") script and a post-install script, the method further comprising:
installing the DLPAR script;
running the post-install script; and
registering the DLPAR script with a dynamic reconfiguration framework of an operating system using the post-install script.

4. The method of claim 3, wherein the post-install script:
registers for the DLPAR script to be unregistered upon the reboot of the device; and
registers for the one or more default values for the one or more tunable computing parameters to be applied upon reboot of the device.

5. The method of claim 3, wherein applying the one or more second values for the one or more tunable computing parameters associated with the interim software code fix includes:
determining the one or more second values for the one or more tunable computing parameters; and
adjusting the one or more tunable computing parameters to the one or more second values using the DLPAR script.

6. The method of claim 2, wherein the software fix package includes a tuning program that manages tuning of values for the one or more tunable computing parameters.

7. The method of claim 6, wherein adjusting the one or more first values for the one or more tunable computing parameters associated with the interim software code fix includes:
invoking the tuning program to adjust the one or more tunable computing parameters to the one or more first values; and
registering the tuning program as a dynamic reconfiguration event handler.

8. The method of claim 2, wherein adjusting the one or more tunable computing parameters to the one or more first values includes:
utilizing an interim fix manager to adjust the one or more tunable computing parameters to the one or more first values; and
registering the interim fix manager as a dynamic reconfiguration event handler.

9. A system comprising:
a memory; and
a processor in communication with the memory, the processor being configured to perform operations comprising:
receiving a software fix package;
applying an interim software code fix of the software fix package to software of a device, wherein the interim software code fix includes adjusting one or more tunable computing parameters to one or more first values;
identifying that a reboot of the device is recommended for application of a permanent code fix of the software fix package;
identifying that the device was not rebooted after receipt of the software fix package;
determining that a dynamic reconfiguration event has taken place; and
applying, automatically by the processor, one or more second values for the one or more tunable computing parameters associated with the interim software code fix of the software fix package.

10. The system of claim 9, the processor being further configured to perform operations comprising:
determining that the reboot of the device has been initiated; and
applying one or more default values for the one or more tunable computing parameters.

11. The system of claim 10, wherein the software fix package includes a dynamic logical partitioning ("DLPAR") script and a post-install script, the processor being further configured to perform operations comprising:
installing the DLPAR script;
running the post-install script; and
registering the DLPAR script with a dynamic reconfiguration framework of an operating system using the post-install script.

12. The system of claim 11, wherein the post-install script:
registers for the DLPAR script to be unregistered upon the reboot of the device; and
registers for the one or more default values for the one or more tunable computing parameters to be applied upon reboot of the device.

13. The system of claim 11, wherein applying the one or more second values for the one or more tunable computing parameters associated with the interim software code fix includes:
determining the one or more second values for the one or more tunable computing parameters; and
adjusting the one or more tunable computing parameters to the one or more second values using the DLPAR script.

14. The system of claim 10, wherein the software fix package includes a tuning program that manages tuning of values for the one or more tunable computing parameters.

15. The system of claim 14, adjusting the one or more first values for the one or more tunable computing parameters associated with the interim software code fix includes:
invoking the tuning program to adjust the one or more tunable computing parameters to the one or more first values; and
registering the tuning program as a dynamic reconfiguration event handler.

16. The system of claim 10, wherein adjusting the one or more tunable computing parameters to the one or more first values includes:
utilizing an interim fix manager to adjust the one or more tunable computing parameters to the one or more first values; and
registering the interim fix manager as a dynamic reconfiguration event handler.

17. A computer program product comprising a computer readable storage medium having program instructions embodied therewith, the program instructions executable by a processor to cause the processor to perform operations, the operations comprising:
  receiving a software fix package;
  applying an interim software code fix of the software fix package to software of a device, wherein the interim software code fix includes adjusting one or more tunable computing parameters to one or more first values;
  identifying that a reboot of the device is recommended for application of a permanent code fix of the software fix package;
  identifying that the device was not rebooted after receipt of the software fix package;
  determining that a dynamic reconfiguration event has taken place; and
  applying, automatically by the processor, one or more second values for the one or more tunable computing parameters associated with the interim software code fix of the software fix package.

18. The computer program product of claim 17, the processor being further configured to perform operations comprising:
  determining that the reboot of the device has been initiated; and
  applying one or more default values for the one or more tunable computing parameters.

19. The computer program product of claim 18, wherein the software fix package includes a dynamic logical partitioning ("DLPAR") script and a post-install script, the processor being further configured to perform operations comprising:
  installing the DLPAR script;
  running the post-install script; and
  registering the DLPAR script with a dynamic reconfiguration framework of an operating system using the post-install script.

20. The computer program product of claim 19, wherein applying the one or more second values for the one or more tunable computing parameters associated with the interim software code fix includes:
  determining the one or more second values for the one or more tunable computing parameters; and
  adjusting the one or more tunable computing parameters to the one or more second values using the DLPAR script.

* * * * *